United States Patent [19]

Johnson

[11] Patent Number: 4,804,250
[45] Date of Patent: Feb. 14, 1989

[54] OPTICAL PROCESSOR FOR AN ADAPTIVE PATTERN CLASSIFIER

[75] Inventor: John L. Johnson, Huntsville, Ala.

[73] Assignee: The United States of America as represented by the Secretary of the Army, Washington, D.C.

[21] Appl. No.: 60,872

[22] Filed: Jun. 12, 1987

[51] Int. Cl.$^4$ .................. G06G 9/00; G02B 27/46
[52] U.S. Cl. ........................... 330/162.12; 364/822
[58] Field of Search ............... 350/162.14, 162.13, 350/162.11, 162.12; 364/822

[56] References Cited

U.S. PATENT DOCUMENTS 4,743,097  5/1988  Johnson et al. ................. 350/337

Primary Examiner—Bruce Y. Arnold
Attorney, Agent, or Firm—Freddie M. Bush; Robert C. Sims

[57] ABSTRACT

A multipurpose optical processor is described which functions as a multislab dual scale adaptive pattern classifier. Normalization, enhancement, inhibitory convolutions, recurrent feedback, code stabilization, time sequences, reconstruction from partial data, and tracking systems are shown to be incorporated in the invention.

11 Claims, 3 Drawing Sheets

OPTICAL PROCESSOR FOR AN ADAPTIVE PATTERN CLASSIFIER

DEDICATORY CLAUSE

The invention described herein may be manufactured, used, and licensed by or for the Government for governmental purposes without the payment to us of any royalties thereon.

BACKGROUND OF THE INVENTION

This invention is related to the system disclosed in U.S. Pat. No. 4,743,097 "Incoherent Image Intensity Normalization, Contour Enhancement and Pattern Recognition Systems" by Johnson, Gregory and Kirsch. That disclosure showed how to build an optical system that could intensity-normalize and contour-enhance an image in real time according to specific neural model processing principles. That disclosure also showed how the same optical processor could be modified to include a reference target image and then function as a new type of an incoherent optical correlator.

This disclosure adds new techniques and new components which increase the system's capability.

SUMMARY OF THE INVENTION

An optical processor architecture for implementing a neuromorphic adaptive pattern classifier combines an inhibitory light valve with an incoherent optical convolver to perform the functions of an adaptive two-slab neural network model. A hybrid electro-optic system with a digital frame memory has functional capabilities including short term memory, adaptive long term memory, contour enhancement, pattern normalization, full recall from partial data, and limited time sequence encoding and recall. The electro-optical architecture uses currently available hardware and is intended for real-time operation with video images.

DETAILED DESCRIPTION OF THE DISCLOSURE

An optical processor architecture based on the principals of neural modeling is described. The four-dimensional associative interconnection problem can be resolved in practice by use of the concept of a dual scale in the form of spacial multiplexing. A liquid crystal light valve is shown to be capable of providing a normalizing nonlinear input-output response characteristic of a neural cell model. This is distinct from a nonlinear sigmoid response function. An inhibiting operating mode of the valve together with an incoherent optical convolver is shown to model the functions of many slab processing features. The inclusion of integrating digital memories permit retention of the adaptive associations among slabs. An adaptive pattern classifier from Grossberg's models is used as an example, and an appropriate architecture for it is given.

Figure 1:
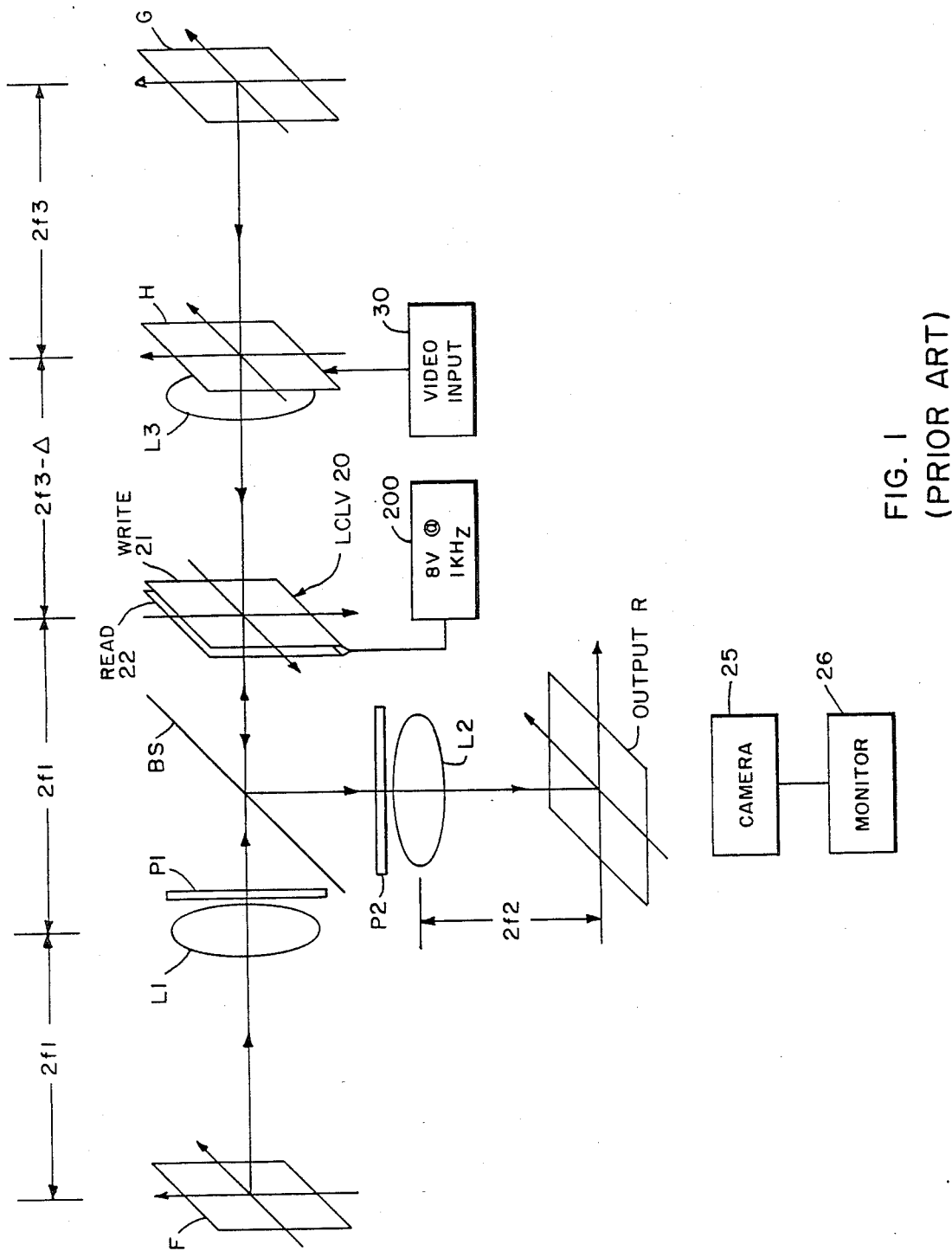
FIG. 1 is an optical processor arrangement. A reflective liquid crystal light valve with a nonlinear response is operated between parallel output polarizers as an inhibitor. The writing intensity is produced by a defocussed incoherent convolver using images G and H, and the read light is an incoherent intensity distribution F reimaged from an input scene. The output R is imaged onto a video camera.

The intensity normalization aspect of the system shown in FIG. 1 is described as follows. Suppose the illuminating intensity (sunlight or artifical lighting) varies in the input scene. This generally produces an image with absolute contrasts corresponding to the absolute illumination. The invention described here takes advantage of an inhibition mode of the Hughes liquid crystal light valve 20 (LCLV) with the result that each point in the processed image will approach a final intensity level proportional to the relative intensity at that point in the scene rather than the absolute intensity at that point. Many digital image processing routines require that the image first be intensity normalized. This is a lengthy, time consuming operation when done digitally. The system described in this disclosure performs image intensity normalization in near real time, limited by the speed of the LCLV.

A second operation usually performed while digitally (or optically) processing an image is that of edge enhancement There are several standard digital techniques for performing this operation. The system described here performs this time consuming calculation optically in near real time. In almost any pattern recognition system, the edges which define an image are the most important parameters. Often these edges are not sharp due to atmospheric aberrations, low spacial frequency scene elements, or poor quality optical elements. The invention described here improves the relative edge contrast of a scene, thereby making the edges more prominent, which in turn makes the scene easier to further process using digital or optical techniques.

Lastly, the design of a new type of incoherent correlator is shown. The contrast-inverted reference image is displayed at H on a suitable transparency or a LCTV. The intensity on the "write" side 21 of the LCLV 20 becomes a convolution of the LCTV image H and the image G (which is identical to F). The image H is a contrast-inverted version of the actual reference image. Thus the convolution will decrease, rather than increase, as the reference image matches up with the target image in G. If G (and F) are identical to the demagnified reference image, the intensity on the "write" side 21 becomes a broad maximum with a depression in the center (an annular distribution). The LCLV 20 is operated in its inhibition mode. This low broad distribution will be centered on all the target images matching the demagnified reference. As the system intensity normalizes and edge enhances, the targets will suppress the surrounding regions while at the same time they themselves are relatively enhanced and sharpened.

The system is arranged so that the inhibiting convolution can occur anywhere on the entire active region of the LCLV, therefore it can continue to enhance a target undergoing a non-rotating lateral translation in the scene and thus will track a moving target. The correlation (recognition) may beobserved at the output plane R, either directly or with the aid of a television camera 25 and monitor 26.

OPERATION OF THE INVENTION

In operation, the incoherent television image F is imaged by a lens L1 through a plane polarizer P1 onto the "read" side 22 of the LCLV 20. The resultant image reflected from the LCLV is directed using a standard beamsplitter BS, through plane polarizer P2 and imaged by lens L2 onto the output plane. This image is the processor output R. The "write" side 21 of the LCLV is illuminated using another television image, G. This incoherent image passes through the mask H (which may be a simple stop with a central obscuration or a transmittance image provided by an LCTV) located at the aperture of lens L3 and is re-imaged near, but not exactly on, the "write" side of the LCLV. This image is deliberately defocused by an amount $\Delta$, shown in the figure. The polarizer P2 is set parallel to P1. This is 90 degrees from the usual crossed polarizer setting. Normally an intense "write" light results in an intense "read" light. This is not true when P1 is parallel to P2. An intense "write" light will now inhibit the reflectivity of the "read" side of the LCLV. The complete operation of an, LCLV is described in detail in J. Grimberg, et al, Opt. Engr. 14:217, (1975). The LCLV is powered by an 8 volt, 1 KHz sine or rectangular wave source 200.

If the mask H is a simple stop with a central opaque spot, the invention functions as an intensity normalizing and edge enhancing pre-processor. The proposed correlation function of the system would require that the contrast-inverted reference (memory) image be displayed at the location of H in FIG. 1. This may be accomplished using a transparency of the reference image or by using an LCTV modified for the purpose. Essentially the modification would involve removing the factory attached polarizers and holding the display screen vertical with fabricated supports. This has successfully been done for a different application. Test scenes can then be applied by a video input device 30 to the correlator by displaying them simultaneously as the same television image at F and G. If the test scene matches the reference scene, a correlation enhancement will be detected at plane R. This may be detected visually or with a television camera 25.

RESULTS

The invention has been used to demonstrate image intensity normalization and edge enhancement. A first photograph was taken from television monitor 26 which was displaying the output from a television camera and lens combination placed at the output plane R. The "writing" intensity from the image at G was blocked, thus the reflected image F was not inhibited (normalized). The LCLV responded with a uniform high reflectivity. The "writing" light was then unblocked and a 2 cm opaque central spot stop placed in front of the 5 cm diameter lens L3. The reflectivity of the LCLV was then inhibited and the resulting intensity normalized image is shown by a second photograph.

A demonstration of edge enhancement has been done using two circular spots as an input scene F. One spot was more reflective (and thus appeared brighter) than the other. A photograph of the input scene was taken. The contrast difference was obvious. A measurement of this difference was obtained using a Colorado Video image digitizer. The contrast ratio (the maximum intensity divided by the minimum) was obtained by determining the average intensity of the bright spot and of the darker spot. The contrast ratio was about 2.5. This ratio was measured again after the image of the two spots was processed by the invention described here. The results show the contrast ratio was about 5.0; a significant improvement. The improvement is due to the fact that the system allows each spot to inhibit the other, and the brighter spot thus further suppresses the dimmer spot more than it itself is suppressed. This competitive dominance effect increases the ratio of the intensities of the two spots. This occurs for all nearby pairs in an image, resulting in an overall contrast enhancement.

Figure 2:
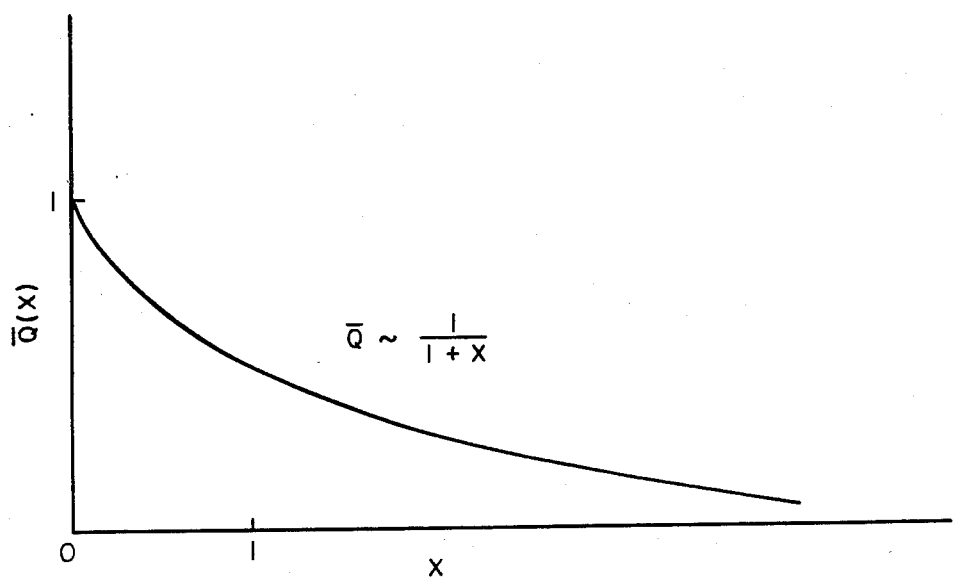
FIG. 2 illustrates a desired nonlinear response of the light valve, shown for the inhibitory setting of the polarizers. This response behavior will permit an intensity normalization effect which becomes exact in the limit of high intensity levels.

The nonlinear response Q of the LCLV is obtained by operating it at nonstandard voltage and control frequencies and is shown in FIG. 2 for the inhibitory setting of the polarizers. Under these conditions the output of the processor is given by $$R = FQ(G*H_\alpha) \quad (1)$$

where $G*H_{60} \int \int du dv G(u,v) H[\alpha(x-u), \alpha(y-v)]$ and $\alpha = (L+\Delta)/\Delta$.

The system provides a variety of possible processing functions depending on the choice and nature of its three input images. Several cases of interest are now discussed. Steady state operation is assumed in equation (1); however, the finite response time of the system will be used to adantage in the discussion section of this paper.

Case 1

F is a uniform illumination of intensity $I_o$, G is a delta function, and H is an image. Then $\overline{R}$ is a uniform image with a demagnified contrast-reversed replica of H centered on the delta function location $(X_o, Y_o)$ and with a nonlinear intensity mapping due to the response $\overline{Q}$:

$$R = I_o Q(H[\alpha(x-x_o), \alpha(y-y_o)]) \quad (2)$$

Case 2

F is an image, G is an image, and H is a simple image $H_o$ which consists of a clear aperture of size D with a central opaque spot of size d<D.

Then G*H at the LCLV is equal to the local spatial sum over G of size D less the local spatial sum over the smaller size d, centered on each point of G:

$$G*H_\alpha = \pi D^2 <G>_D < \pi d^2 <G>_d \quad (3)$$

Then $\overline{R}$ is equal to F, inhibited by $\overline{Q}$ in proportion to this difference. Suppose G has a white spacial frequency content G(w) that is bandlimited in $\Delta w = w_2 - w_1 : G_{(w)} = C, W, < W > W_2$, otherwise equal to zero. c = constant then $$G(x,y) = G_o \text{Sinc}^2\left(\frac{\Delta w}{2\pi} x\right) \text{Sinc}^2\left(\frac{\Delta w}{2\pi} y\right)$$

In a given region of scale size $R_o$ consider $<G>_o$ as compared to the value of G itself in the center of the region. (a) If G is convex in $R_o$ then $<G>_o<G(\text{center})$. (b) If G is concave in $R_o$ then $<G>_o>G(\text{center})$. (c) Also, for fixed $\Delta w$, as $R_o$ becomes large then $$<G>_0 \rightarrow \frac{1}{R_0^2}.$$

Thus in the above expression for $G^*H_a$, for fixed $\Delta w$ it is possible for the first term to become constant as D increases, approaching in value the total power in the image. The second term is the total power within d. If the image is, for example, a few bright points such as a sparse star field, then the second term can be of the same order of magnitude as the first. This corresponds then to an image of only a few features and having a high spacial frequency content.

In regions of low spacial frequencies the first term of (3) dominates, and rises and falls according to (a) and (b), above, more slowly than the Image. It is a low pass filter. Since this is an inhibitor, the output $\bar{R}$ in those regions is the image F inhibited by a low pass filtered version of G. In regions of isolated high spacial frequency content the second term of (3) becomes effective. Since it appears as a negative term, the inhibition of F at those points is decreased. Thus the overall effect of this case is to inhibit F with G except for isolated bright spots in G, which will then also be present as bright spots in F due to the second term of (3).

Case 3

Assume the same inputs as Case 2, but suppose that G consists of two side-by-side spots of unequal brightness. By the process discussed in Case 2, each will inhibit its neighborhood but not itself. Thus if we further choose F=G, then the result will be that all the low spacial content will be suppressed and that adjacent spots will compete with each other such that the dimmer spots will be suppressed relatively more than the brighter spots. The output $\bar{R}$ will consist of only the brightest parts of F and they will be competitively enhanced on a local basis.

Case 4

F and G are the same image, I. I contains one or more demagnified replicas of an image $H_1$. H consists of the transmittive product of $H_1$ and the obscured aperture $H_o$ considered in Case 2. The distribution on the writing side of the light valve will now contain a broad correlation peak due to $H_1$, centered on the locations of the demagnified replicas in 1. Due to the $H_o$ factor, the center of this peak will be depressed, giving an overall annular shape to the correlation peak. This combined effect is true for many, but not all, images $H_1$. It implies that $H_1$ has sufficient structure extending beyond the obscuration $H_o$ to induce a correlation peak, but not so strong as to overcome the central reduction due to $H_o$. When this acts on F through the response Q, the result is that the target $H_1$ will suppress everything around it but will not itself be as strongly inhibited. Further, the factor $H_o$ will have the same effect as in case 2 in the other regions. The output R will consist of F, suppressed everywhere except at the targets $H_1$, and they will be enhanced. This case serves as a new type of incoherent correlator. A variation of this case can serve as a processor for an upconverted phased array radar. Here, a pilot signal image is introduced in G at the location of the expected return. This signal is made much stronger than the actual return and thus strongly inhibits the radar jammer distribution while providing a "pedestal" of high response when the return pulse pattern arrives on the read side of the light valve.

Case 5

This case is also a type of incoherent correlator but does not use the superimposed $H_o$ aperture. F and G are the same as in Case 4 but H is now the contrast-inverted version of the reference image: $H = I - H_1$ then $G^*H_a = \pi D^2<G>_D - G^*H_{1a}$.

Regions of G not containing the demagnified replica of the reference will be inhibited by the low-pass filtered image of G. This inhibition will be decreased where G contains $H_{1a}$, due to the second term $H_{1a}^*H_{1a}$ at that point. Since F=G, the output $\bar{R}$ will consist of F, suppressed everywhere except at the location of the targets $H_{1a}$ and they will be enhanced by their full correlation with the matching reference target image.

Case 6

H is unity, F and G are equal to the same image I. Here, the nonlinear response Q gives the output $\bar{R}$ at a given point $P_o$ in !:

$$R = \frac{I(P_0)}{2 + \pi D^2<I>}$$

If we scale the scene illumination, then both the numerator and denominator vary together, and in the limit of strong illumination $\bar{R}$ at each point becomes independent of the absolute intensity and proportional to the local relative intensity.

These cases give insight as to how the above processor could be used to implement a two-slab adaptive pattern classifier. The additional components required are a memory in which to sum and store image outputs, and an image mixer whose purpose is to prevent new information from destroying previously adapted associations.

An essential concept in this approach is that of dual scales. A hologram is an example of a dual scale system. The elemental unit of a hologram is not a single point but rather a finite patch which contains the scene as viewed at one particular angle. The overall image is built up of many smaller images. Another example is a biological neural network in which the basic processing unit is a cell of finite size. The weight distribution of adaptive synaptic connection points on its surface represents a demagnified partial "image" of the cell activity in the local neighborhood. The dual scale concept affords a solution to the problem of how to implement the four-dimensional associative interconnections. Each processing point is extended to be a patch of finite size in which to write the associative distributions. This sacrifices some of the available resolution but reduces the dimensionality to an achievable level.

Neural Model

The Grossberg neural model describes the behavior of both the model cell and the behavior of networks of interconnected cells. Each cell receives signals as either excitatory or inhibitory inputs and applies separate weights to each input. The weights, or synaptic connection strengths, can be hardwired or adaptive. The weighted sum drives an internal activity cell parameter. When it exceeds a non-negative threshold, the cell generates an output signal proportional to the excess.

Its output is distributed to other cells in the network, including itself, depending on the network interconnection design. Grossberg finds several general-purpose subnetworks which have extensive application in his models. They are used to normalize the total activity, provide short term memory functions, memorize and recall activity patterns, and stabilize and provide code protection f previously adapted interconnections against erasure by new information. A basic nonlinear cell response, the Sigmoid function, is required by Grossberg's model in order to achieve stability against recycled noise. The internal activity x of a cell is given by Grossberg, *Studies of Mind and Brain*, Reidel Publishing Co., Dotrecht, Holland (1982), as $$x = A_x + \left(\begin{array}{c}\text{weighted outputs}\\ \text{from other cells}\end{array}\right) + \left(\begin{array}{c}\text{internal contributions}\\ \text{formed within the cell}\end{array}\right)$$

and its output X obeys $X=S(x)$. The function S is a sigmoid function as illustrated in FIG. A2, p. 50 of Grossberg. (same reference)

The adaptation processes of a slab are accounted for by slow changes in the synaptic connection strengths. The contribution to the internal activity of the $n^{th}$ cell due to adaptively connected inputs $T_m$ is $\Sigma_m W_{mn} T_m$, where $\dot{W}_{mn} = -D_o W_{mn} + D_1 T_m X_n$ and $D_o$, $D_1$ are constants.

Multislabs: The Adaptive Pattern Classifier (APC)

a. APC Funciton

Consider a network slab with the fixed and adaptive interconnections outlined above. Conceptually separate the slab into two slabs such that each receives a separate input distribution. Each cell on one slab has adaptive connections from a region on the other slab, but not from its own slab. This system will adapt by associating the two inputs I and J such that at some later time if slab #1 receives I, it will set up an adaptive resonance that reactivates the J distribution on slab 2, and vice versa. If slab #1 receives a distribution K different from I, the adaptive resonance will not occur. This can be used as an adaptive pattern classifier if I is the target image and J is a codeword image. J will be activated only when slab #1 views the original target image I. By usingadditional images and codeword pairs in successive training sessions the system can store additional associations.

b. Optical APC

Figure 3:
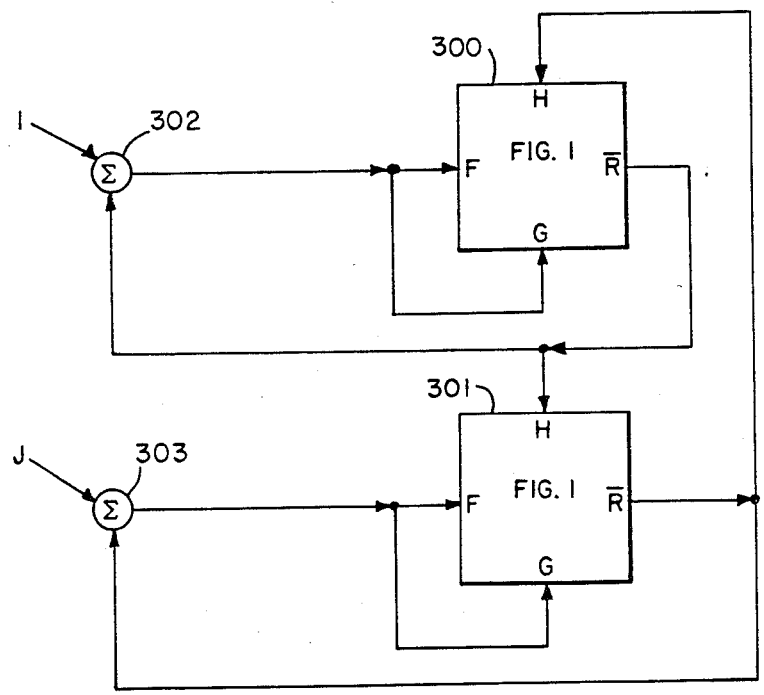
FIG. 3 is an optical adaptive pattern classifier without memory. Each optical processor's output feeds the inhibitory correlation input channel of the other processor. This results in an adaptive encoding of each image on a demagnified contrast-inverted scale into all the dominant peaks of the other image.
Figure 4:
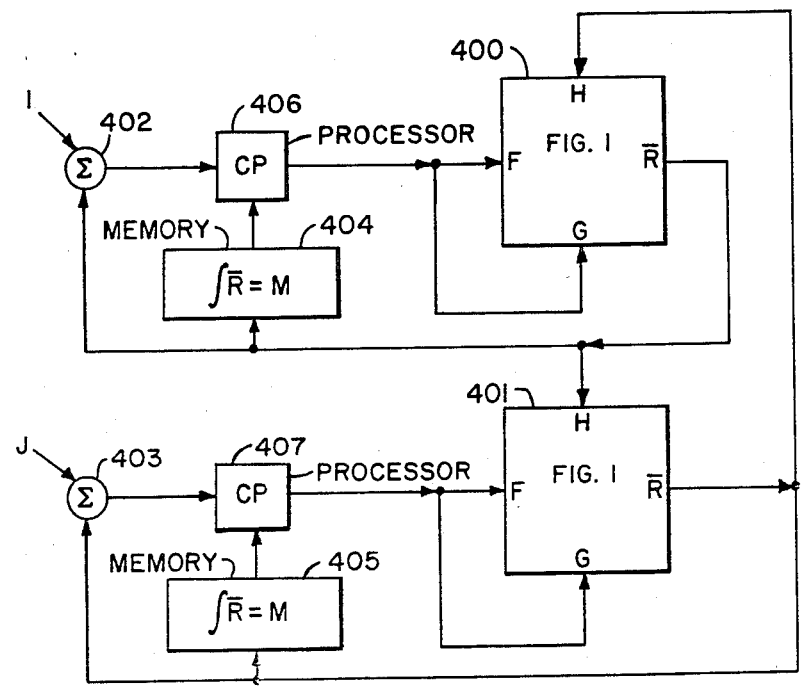
FIG. 4 is an optical adaptive pattern classifier with memory and elementary code protection CP. When a previously encoded image is presented to one input, the system will select the correspondingly encoded image and enhance it. This in turn reinforces the first image, which further enhances the second image. This process permits recall of either image in terms of the other image.

Consider first two optical processors 300 and 301, each being the same set up as FIG. 1. Each output $\overline{R}$ is used as the H- input to the other, as shown in FIG. 3. Recurrent paths are also provided for each processor. Suppose an image I is briefly presented to processor 300, and an image J to processor 301 by way of input summing or mixing points 302 and 303. The first cycle simply passes I and J as the first outputs $R_1$ and $R_2$. At this point the recurrent loops sustain the inputs as short term memory and at the same time the correlator loops are activated by the non-zero inputs at H. These inputs serve as structured on - center/off - surround inhibitory feed patterns and yield enhancements of I and J according to one another's shape in a demagnified local neighborhood (Case 2 and Case 3). At the same time the regions of the most dominant image pattern features of I and J are impressed with a demagnified contrast-reversed replica of each other (Case 1). These new outputs continue to recycle until the outputs reach an intensity-normalized (case 6) equilibrium steady state. The system has at this point stored the inputs in short-term memory, normalized and contour-enhanced them, and has encoded each image on a small scale into the dominant large-scale features of the other image. Next add an integrating memory unit for each output. At this point it is desirable to incorporate a content-specific memory inhibition for partial code stabilization. This consists of a subcircuit CP which suppresses the input at all locations corresponding to regions of the memory containing non-zero data. The system now appears as sketched in FIG. 4. The memory 404 and 405 integrates $\overline{R}$ from first processor 400 and second processor 401 on a much slower time scale than the rest of the system. Although a memory decay time could be incorporated into the system, for discussion here, the memory will be externally controlled. Code Processors CP 406 and 407 can be added to the system. The processors 406 and 407 can have a code protection algorithm p such as $F=(I+R)(-M_{max}-M)+M$. Initially the memory is zero. As each processor reaches a steady output equilibrium state $\overline{R}$, the memory is turned on to record it and then switched to passive storage. Now a new input K is applied to the first unit. If $K=I$, the $\overline{R}_1$ and K will tend to fill each other in. The result will be that the input F has fewer features to enhance and the recycled output will be more suppressed. As time goes on, the new input continues to supress the original content of the short term emory and replace it with its own enhanced version. Now turn on the memory. If there are no features matching K, the processor will proceed to encode K in the unused parts of the memory. Now instead, suppose that some large scale $M_1$ memory patterns match K, that is, $K=I$. These will be reinforced, since they match the original $\overline{R}_1$ formed by I, and will become dominant. These feed H in the second processor. Its memory is active, and the image J in the memory previously encoded by the image I is being presented to the second processor. $M_2$ contains the image J encoded with the contrast-inverted demagnified replicas of I. These are of the form discussed in Case 5.

At each of these encoded points in the second processor, the convolution is then $G^*H_\alpha = \pi D^2 <I_\alpha> -I_\alpha^* I_\alpha$. Thus near the encoded point we have a strong inhibition due to the first term, but at the point, we have a weakened inhibition due to the $(-I_\alpha^* I_\alpha)$ factor. This occurs for every encoded point of J. Thus the overall pattern of correlations is exactly "J", and it emerges on the large scale of $\overline{R}_2$ due to the small scale correlation patterns of the I encoded into J. The large scale output $\overline{R}_2$ is thus J, the image originally associated with I. Likewise if $K=J$ had been presented to the second processor, the system would have recalled I from the first processor. Once this recall has occurred, each processor is delivering its output to the other and continually re-enforcing the recall strength of both I and J. The system then is in a state of adaptive resonance and has performed the basic function of the adaptive pattern classifier.

Reconstruction from Partial Data and Time Sequences.

Figure 5:
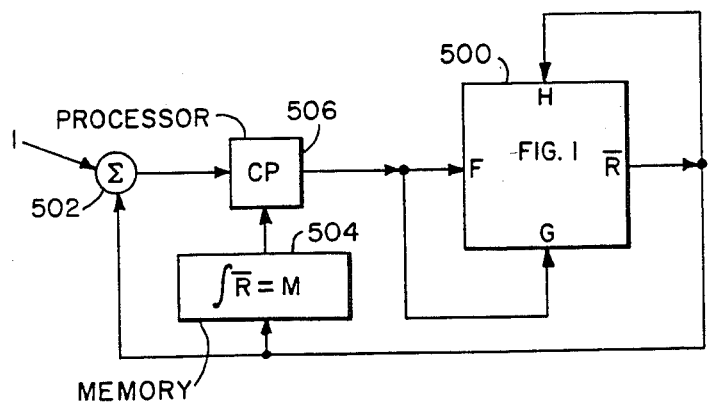
FIG. 5 is a single optical processor with self-encoding. This system can recall full images from partial inputs, and can recall time sequences in a limited sense.

In the adaptive pattern classifier of section IV the slab was conceptually separated into two slabs which communicated through adaptive interconnections. Suppose now we recombine the two slabs. Take an "FGH"

processor and use its output $\overline{R}$ as the H input, as shown in FIG. 5. Devices 500, 502, 504 and 506 of FIG. 5 are the same as devices 400, 502, 404 and 406 respectively as described above.

This system can reconstruct a full image, given partial information. Suppose the input I through summing or mixing point 502 consists of the large image "XO". The H-feedback will encode the total preprocessed image with itself on a small scale. If the system is now presented with part of the image, (the "O" for example) this part will correlate with itself over the entire original image in the first cycle. The output will now contain the current partial input plus a less intense version of the entire image. The recurrent feedback applies this as the new input, which will more strongly correlate with itself in memory and read out the original complete image with more intensity. The system will enter a resonance with the original full image as the output. Due to the finite time of response in the cycles, the full image appears at a time later than the partial image.

This ability to casually reconstruct a full scene given part of the scene also allows the memorization and recall of time sequences. This is not unexpected, as neural networks are intrinsically indifferent to space and time. Suppose that the system of FIG. 5 is presented with a sequence of training images A,B,C,D—. Then the recurrent feedback loop will cause the input to the FGH processor to be multiple overlapping sets A,AB,BC,CD,DE,—. If the system, after training, is presented with image A, it will reconstruct A and then AB. The recurrent loop allows the "B" part of the image to reconstruct BC, which in turn reconstructs CD, and so on until the complete sequence has been recalled. The simple system discussed here will recall the entire set without removing the previously recalled elements and, given an element in the center of the sequence, will proceed in both directions of the initial sequence. These deficiencies might be remedied by incorporating more realistic neural subnetworks with finite decay times, for example. What it does do correctly is recall the elements in the order of their presentation, either ascending or decending, in the sequence.

Summary

A design for an optical processor has been presented. Its behavior has been discussed. It has been shown to yield fuctions which correspond to those found in adaptive multislab neural models. The processor has components which are available commercially or which can be realized in straightforward laboratory design practice.

I claim:

1. A system comprising first and second optical processors each comprising a liquid crystal light valve having a read side and a write side, a first image input, first and second plane polarizers, first means for transmitting said first image input through said first polarizer to the read side in focus for reflection from said read side through said second polarizer, a second image input, second means for transmitting said second image input to the write side out of focus, and a transparency means having a third image input thereon, said transparency means being located between said second means and said write side for convolving said second image with said third image, detecting means having an input and an output, said input of the detecting means receiving the 2. A system as setforth in claim 1 wherein the transparency means of each liquid crystal light valve is a liquid crystal TV having the third image on its screen.

3. A system as set forth in claim 2 wherein each of said first and second image inputs are identical.

4. A system as set forth in claim 3 further comprising first and second summing points connected between the outputs of the detecting means and the first image input of said first and second optical processors respectfully.

5. A system as set forth in claim 4 further comprising first and second code processors connected between the first and second summing points and the first image inputs of said first and second optical processors respectfully.

6. A system as set forth in claim 5 further comprising first and second memory integrators connected between the code processors and the output of the detecting means of said first and second optical processors respectively.

7. A system comprising a liquid crystal light valve having a read side and a write side, a first image input, first and second plane polarizers, first means for transmitting said first input through said first polarizer to the read side in focus for reflection from said read side through said second polarizer, a second image input, second means transmitting said second image input to the write side out of focus, and a transparency means having a third image input thereon, said transparency means being located between said second means and said write side for convolving said second image with said third image, detecting means having an input and an output, said input of the detecting means receiving the reflected light after it passes through said second polarizer, an output image signal appearing on the output of said detecting means and means connecting the output image signal so as to form the third input image.

8. A system as set forth in claim 7 wherein said first and second image inputs are identical.

9. A system as set forth in claim 8 further comprising a summing point connected between the output of the detecting means and the first image input.

10. A system as set forth in claim 9 further comprising a code processor connected between the summing point and the first image input.

11. A system as set forth in claim 10 further comprising a memory integrater connected between the code processor and the output of the detecting means.

* * * * *

UNITED STATES PATENT AND TRADEMARK OFFICE
CERTIFICATE OF CORRECTION

PATENT NO. : 4,804,250
DATED : February 14, 1989
INVENTOR(S) : John L. Johnson

It is certified that error appears in the above-identified patent and that said Letters Patent is hereby corrected as shown below:

Title page, Item (52) "330/162.12" should read --350/162.12--.

Column 10, line 4, "." should read --,--.

Column 10, line 9, after "the" insert --reflected light after it passes through said second polarizer, and an output image appearing on the output of said detecting means in accordance to the said reflected light; and first and second connector means connecting the output image of said first optical processor so as to be the third input of said second optical processor and the output image of said second optical processor so as to be the third image input of said first optical processor.--.

Signed and Sealed this

Fourth Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,804,250
DATED : February 14, 1989
INVENTOR(S) : John L. Johnson

It is certified that error appears in the above-identified patent and that said Letters Patent is hereby corrected as shown below:

Column 10, line 32 or claim 7, line 4, before "input" --image-- should be inserted.

Signed and Sealed this

Eighth Day of August, 1989

Attest:

DONALD J. QUIGG

Attesting Officer

Commissioner of Patents and Trademarks